(12) United States Patent
Sugawara et al.

(10) Patent No.: US 8,116,606 B2
(45) Date of Patent: Feb. 14, 2012

(54) FIBER OPTIC

(75) Inventors: Takeo Sugawara, Hamamatsu (JP); Akira Tominaga, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 162 days.

(21) Appl. No.: 12/524,977

(22) PCT Filed: Feb. 7, 2008

(86) PCT No.: PCT/JP2008/052053
§ 371 (c)(1), (2), (4) Date: Jul. 29, 2009

(87) PCT Pub. No.: WO2008/099755
PCT Pub. Date: Aug. 21, 2008

(65) Prior Publication Data
US 2010/0104248 A1 Apr. 29, 2010

(30) Foreign Application Priority Data
Feb. 13, 2007 (JP) .................................. 2007-032422

(51) Int. Cl.
*G02B 6/08* (2006.01)

(52) U.S. Cl. ........ 385/120; 385/116; 385/123; 385/141; 385/96

(58) Field of Classification Search .................. 385/120, 385/144, 115, 116, 141, 123, 96, 97, 99; 501/78, 64, 73; 65/385, 406, 408, 411
See application file for complete search history.

(56) References Cited

U.S. PATENT DOCUMENTS

| | | | | |
|---|---|---|---|---|
| 3,901,718 A | | 8/1975 | Wu | 501/46 |
| 5,413,971 A | * | 5/1995 | McPherson | 501/78 |
| 5,696,039 A | | 12/1997 | Sugawara | 501/78 |
| 5,815,625 A | | 9/1998 | Sugawara | 385/120 |
| 6,556,757 B2 | * | 4/2003 | Ellison et al. | 385/127 |
| 6,727,198 B1 | | 4/2004 | Hashimoto et al. | 501/69 |
| 7,515,802 B2 | * | 4/2009 | Peuchert et al. | 385/127 |
| 2006/0048679 A1 | | 3/2006 | Fujiwara et al. | 106/482 |
| 2007/0196671 A1 | * | 8/2007 | Kobayashi | 428/447 |
| 2010/0104248 A1 | * | 4/2010 | Sugawara et al. | 385/120 |

FOREIGN PATENT DOCUMENTS

| | | |
|---|---|---|
| JP | 2-38343 | 2/1990 |
| JP | 7-325212 | 12/1995 |
| JP | 9-71436 | 3/1997 |

(Continued)

OTHER PUBLICATIONS

Tomoyuki Nakayama et al., "Fiber Optic Plate to Sono Oyo," ITEJ Technical Report, Sep. 28, 1990, vol. 14, No. 53, pp. 1-6. (with partial English-language translation attached).
Iwanami Rikagaku Jiten, "Iwanami Dictionary of Physics and Chemistry," The 4th Edition, 1987, pp. 498-499 (with partial English-language translation attached).

(Continued)

*Primary Examiner* — Brian Healy
(74) *Attorney, Agent, or Firm* — Drinker Biddle & Reath LLP

(57) ABSTRACT

A fiber optic includes a plurality of fibers each including a core made of core glass for propagating light and a cladding for covering an outer periphery of the core and made of cladding glass lower in refractive index than the core glass and an absorber glass arranged between the plurality of fibers and for absorbing light leaking from the plurality of fibers. The plurality of fibers are bundled and integrated. The absorber glass contains $Fe_3O_4$ being iron oxide crystals.

8 Claims, 19 Drawing Sheets

FOREIGN PATENT DOCUMENTS

| | | |
|---|---|---|
| JP | 2001-33635 | 2/2001 |
| JP | 2003-137595 | 5/2003 |
| JP | 2004-076372 | 9/2004 |
| JP | 4046786 | 11/2007 |
| JP | 2008-184355 | 8/2008 |
| WO | WO 85/02265 * | 5/1985 |
| WO | 2004/076372 | 9/2004 |

OTHER PUBLICATIONS

Zhou Zhongshen et al., "Mossbauer Studies on Iron in Polybasic Silicate Glass," Journal of Non-Crystalline Solids, Jul. 2, 1986, vol. 84, Nos. 1-3, pp. 34-44.

* cited by examiner

Fig.16

| | SAMPLE No. | 1 | 2 | 3 | 4 | 5 | 6 | 7 | 8 | 9 | 10 | 11 | 12 | 13 |
|---|---|---|---|---|---|---|---|---|---|---|---|---|---|---|
| COMPOSITION [%] | $SiO_2$ | 39.1 | 30.2 | 46.0 | 43.0 | 34.5 | 46.0 | 35.9 | 35.9 | 35.9 | 36.9 | 38.5 | 38.7 | 43.0 |
| | $B_2O_3$ | 18.2 | 18.2 | 11.7 | 14.7 | 18.2 | 11.7 | 18.2 | 16.5 | 19.1 | 16.5 | 16.5 | 16.7 | 5.5 |
| | $Al_2O_3$ | 3.6 | 3.6 | 3.3 | 3.3 | 3.6 | 3.3 | 2.8 | 2.8 | 2.8 | 2.8 | 2.8 | 0.4 | 3.3 |
| | $Na_2O$ | 9.1 | 9.1 | 7.6 | 7.6 | 9.1 | 8.3 | 8.3 | 8.3 | 8.3 | 7.6 | 8.3 | 8.3 | 7.6 |
| | $K_2O$ | 4.5 | 4.5 | 3.9 | 3.9 | 4.5 | 4.2 | 4.2 | 4.2 | 4.2 | 3.9 | 4.2 | 4.2 | 3.9 |
| | $CaO$ | 2.7 | 2.7 | 2.5 | 2.5 | 2.7 | 2.5 | 2.7 | 2.7 | 2.7 | 2.7 | 2.7 | 2.5 | 2.5 |
| | $BaO$ | 4.5 | 4.5 | 4.2 | 4.2 | 4.5 | 1.0 | 4.6 | 4.6 | 2.0 | 4.6 | 2.0 | 4.2 | 4.2 |
| | $Fe_2O_3$ | 18.2 | 0.0 | 20.8 | 0.0 | 0.0 | 0.0 | 0.0 | 0.0 | 0.0 | 0.0 | 0.0 | 0.0 | 0.0 |
| | $Fe_3O_4$ | 0.0 | 18.2 | 0.0 | 20.8 | 22.7 | 23.0 | 23.3 | 25.0 | 25.0 | 25.0 | 25.0 | 25.0 | 30.0 |
| TOTAL [%] | | 100 | 91 | 100 | 100 | 100 | 100 | 100 | 100 | 100 | 100 | 100 | 100 | 100 |
| COEFFICIENT OF THERMAL EXPANSION α [$10^{-7}$/°C] | | 91.9 | 101.4 | 87.4 | 86.9 | 94.9 | 86.9 | 91.4 | 91.9 | 92.9 | 92.9 | 92.9 | 85.4 | 87.9 |
| GLASS TRANSITION POINT Tg [°C] | | 476 | 475 | 491 | 489 | 471 | 487 | 483 | 479 | 505 | 480 | 505 | 477 | 495 |
| DEFORMATION POINT At [°C] | | 533 | 526 | 556 | 547 | 529 | 559 | 533 | 529 | 565 | 534 | 574 | 523 | 564 |
| VITRIFIED STATE | | ○ | ○ | ○ | ○ | ○ | ○ | ○ | ○ | ○ | ○ | ○ | ○ | △ |
| TRANSMITTANCE [%] | | 18.3 | $7.2 \times 10^{-6}$ | 9.68 | $1.0 \times 10^{-5}$ | $2.0 \times 10^{-5}$ | $2.3 \times 10^{-6}$ | $2.2 \times 10^{-6}$ | $6.7 \times 10^{-7}$ | $3.0 \times 10^{-6}$ | $2.7 \times 10^{-6}$ | $7.2 \times 10^{-6}$ | $2.7 \times 10^{-6}$ | $1.5 \times 10^{-6}$ |

Fig.17

|  |  | CORE GLASS | | CLADDING GLASS |
|---|---|---|---|---|
|  |  | EXAMPLE 1 | EXAMPLE 2 | |
| COMPOSITION [%] | $SiO_2$ | 43 | 66 | 69 |
|  | $B_2O_3$ | 10 | 0 | 1 |
|  | $Al_2O_3$ | 5 | 0 | 2 |
|  | $R_2O$ | 13 | 21 | 17 |
|  | RO | 25 | 0 | 11 |
|  | $TiO_2$ | 0 | 11 | 0 |
|  | $ZrO_2$ | 4 | 0 | 0 |
|  | F | 0 | 2 | 0 |
| TOTAL [%] | | 100 | 100 | 100 |
| REFRACTIVE INDEX nd | | 1.57 | 1.55 | 1.52 |
| COEFFICIENT OF THERMAL EXPANSION [$10^{-7}$/°C] | | 98 | 101 | 99 |
| GLASS TRANSITION POINT Tg [°C] | | 544 | 501 | 515 |
| DEFORMATION POINT At [°C] | | 606 | 542 | 570 |
| DENSITY D [g/cc] | | 2.99 | 2.54 | 2.49 |

FIBER OPTIC

TECHNICAL FIELD

The present invention relates to a fiber optic.

BACKGROUND ART

Fiber optics (FOs) are imaging devices formed by bundling and integrating a plurality of fibers that propagate light, and have been used as, for example, optical waveguides of optical instruments such as image intensifiers, faceplates of CRTs, and CCD couplings.

In such FOs, there has been known a configuration for preventing degradation in resolution and noise generation by preventing light (stray light) leaking from a fiber propagating light from entering another fiber. Examples thereof include a configuration of interposing an absorber between the cores to absorb stray light.

Such an absorber contains an oxide colorant, and the oxide colorant determines absorption characteristics of the absorber. For example, it has been known that absorption characteristics of the absorber in the visible light region become satisfactory when $Fe_2O_3$ is used as an oxide colorant (see Patent Document 1, for example). Moreover, when FeO is used as an oxide colorant, absorption characteristics of the absorber in the near-infrared region become satisfactory. Therefore, it has been known that absorption characteristics of an absorber in the visible light region to the near-infrared region become satisfactory by making the absorber contain FeO and $Fe_2O_3$ (see Patent Document 2 and Patent Document 3, for example).

Patent Document 1: Japanese Published Unexamined Patent Application No. H02-38343
Patent Document 2: Japanese Published Unexamined Patent Application No. H09-71436
Patent Document 3: Japanese Published Unexamined Patent Application No. 2003-137595

DISCLOSURE OF THE INVENTION

Problem to be Solved by the Invention

As described above, because absorption characteristics of the absorber have great influence on the resolution of the FO, a further improvement in absorption capacity of the absorber has been demanded.

The present invention has been made in order to solve such technical problems, and an object thereof is to provide an FO greatly improved in absorption capacity of the absorber.

Means for Solving the Problem

The inventors of the present invention have devoted themselves to continuous study of the subject in order to solve the above-described problems, and discovered that the absorption capacity in the visible light region to the near-infrared region is greatly improved by making an absorber glass contain $Fe_3O_4$, which are iron oxide crystals.

That is, an FO according to the present invention includes: a plurality of fibers each including a core made of core glass for propagating light and a cladding for covering an outer periphery of the core and made of cladding glass lower in refractive index than the core glass; and an absorber glass arranged between the plurality of fibers and for absorbing light leaking from the plurality of fibers, wherein the plurality of fibers are bundled and integrated, and the absorber glass contains $Fe_3O_4$ being iron oxide crystals.

Thus, adopting, as an oxide colorant of the absorber glass, $Fe_3O_4$ being iron oxide crystals higher in absorption capacity than FeO or $Fe_2O_3$ being an oxide colorant allows sufficiently increasing the absorption capacity of the absorber glass from the visible light region to the near-infrared region. This allows forming an FO with little degradation in resolution and noise. In addition, because the absorber glass does not require a lead compound, which is an environmental load substance, environmental pollution at the time of disposal can be reduced.

Moreover, in the FO, there may be a configuration that the absorber glass is arranged between the plurality of fibers and covers outer peripheries of the plurality of fibers. Alternatively, in the FO, there may be a configuration including a plurality of absorber glasses, wherein the cladding is arranged between the plurality of absorber glasses and covers outer peripheries of the plurality of absorber glasses. Even in such a configuration, the absorption characteristics of the absorber glass can be sufficiently enhanced from the visible light region to the near-infrared region.

Moreover, in the FO, it is preferable that the absorber glass contains $Fe_3O_4$ being iron oxide crystals of more than 18% and less than 30% in percent by mass. By making the absorber glass contain $Fe_3O_4$ being iron oxide crystals at more than 18%, a higher absorption capacity can be obtained. Moreover, by making the absorber glass contain $Fe_3O_4$ being iron oxide crystals in a range of less than 30%, the absorber glass can be homogeneously formed.

Moreover, in the FO, it is preferable that $Fe_3O_4$ being iron oxide crystals of the absorber glass is granularly precipitated in the absorber glass. Thus, due to $Fe_3O_4$ being iron oxide crystals existing in a granular form, $Fe_3O_4$ has a larger total surface area than that when $Fe_3O_4$ exists as a mass, so that the absorption capacity of the absorber glass can be greatly improved.

Moreover, in the FO, it is preferable that the absorber glass further contains $Al_2O_3$. Because $Al_2O_3$ acts as a crystallization accelerator, this allows promoting crystal precipitation of $Fe_3O_4$ being iron oxide crystals. Accordingly, crystal precipitation of $Fe_3O_4$ being iron oxide crystals can be efficiently performed. Moreover, due to $Al_2O_3$ acting as a crystal nucleator, the number of crystals of $Fe_3O_4$ to be precipitated can be increased. Therefore, even with $Fe_3O_4$ of an identical mass, the size of individual crystals is reduced, and the total surface area of the crystals as a whole is increased, so that the absorption capacity of the absorber glass can be greatly improved.

Moreover, in the FO, it is more preferable that the absorber glass contains $Al_2O_3$ of less than 7% in percent by mass. Thus, by making the absorber glass contain $Al_2O_3$ in a range of less than 7%, the absorber glass can be homogeneously formed. Being at 7% or more tends to make homogeneous melting of the glass impossible.

Moreover, an FO according to the present invention is formed by drawing while heat-fusing a plurality of single fibers and a plurality of absorber glasses, the plurality of single fibers comprising core glass covered with cladding glass, the plurality of absorber glasses containing $Fe_3O_4$ being iron oxide crystals precipitated through a heat treatment. Moreover, an FO according to the present invention is formed by drawing while heat-fusing a plurality of single fibers and a plurality of first absorber glasses, the plurality of single fibers comprising core glass covered with cladding glass, the plurality of first absorber glasses containing $Fe_2O_3$, wherein a plurality of second absorber glasses formed of the plurality of first absorber glasses contain $Fe_3O_4$ being iron oxide crystals precipitated by heat at the time of heat fusing.

The FOs thus manufactured allow obtaining the same effects as those of the above-described FO.

Effects of the Invention

According to the present invention, in an FO, absorption characteristics of the absorber can be greatly improved by using $Fe_3O_4$, which are iron oxide crystals.

BRIEF DESCRIPTION OF THE DRAWINGS

FIG. 16 A table showing the composition and characteristics of prepared absorber glasses.
FIG. 17 A table showing examples of the composition and characteristics of core glass and cladding glass of an FO.

Figure 1:
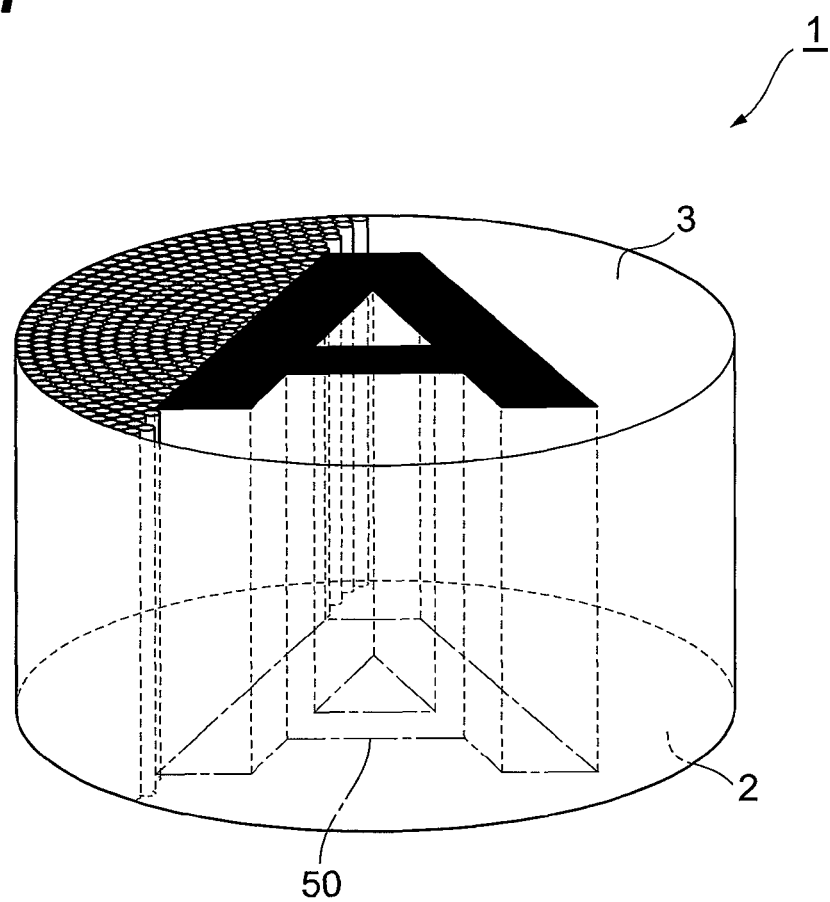
FIG. 1 A perspective view of an FO 1 according to a first embodiment.

DESCRIPTION OF REFERENCE NUMERALS 1, 2 Fiber optic (FO), 10 . . . Core, 11 . . . Core glass, 12 . . . Cladding, 13 . . . Cladding glass, 14 . . . Absorber glass, 15 . . . Fiber.

BEST MODES FOR CARRYING OUT THE INVENTION

Hereinafter, embodiments of the present invention will be described with reference to the accompanying drawings. Here, in the description of the drawings, identical elements are designated by identical reference numerals so as to avoid overlapping descriptions. Also, dimensional ratios in the drawings are not always coincident with those in the description.

First Embodiment

Figure 2:
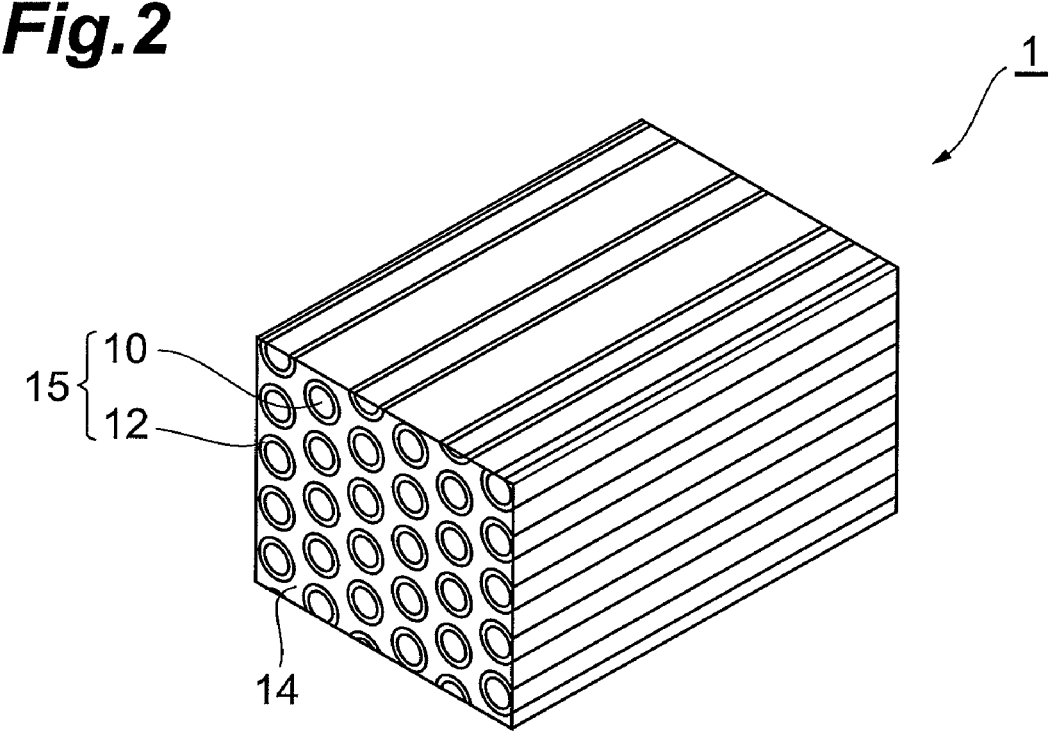
FIG. 2 A perspective view showing an internal structure of the FO 1 of FIG. 1, in an enlarged manner.

FIG. 1 is a perspective view of an FO 1 according to a first embodiment, and FIG. 2 is a perspective view showing an internal structure of the FO 1 of FIG. 1, in an enlarged manner. The FO 1 shown in FIG. 1 is an optical device for which a plurality of optical fibers are bundled and integrated, and has an incident surface 2 and an exit surface 3. The FO 1 has a function of transmitting light and an image 50 made incident from the incident surface 2 to the exit surface 3, and is used as, for example, an optical waveguide of an optical instrument such as an image intensifier, a faceplate of a CRT, a CCD coupling, and a fingerprint detector.

As shown in FIG. 2, the FO 1 is formed by bundling and integrating a plurality of fibers 15 each made of a core 10 and a cladding 12. The FO 1 has a plurality of cores 10 for transmitting light images, a plurality of claddings 12 for covering the outer peripheries of the plurality of cores 10, respectively, and an absorber glass 14 arranged between the fibers 15 and for absorbing light (stray light) leaking from the fibers 15.

The plurality of cores 10 have thin fiber shapes, and disposed aligned in a direction perpendicular to the axial direction. The core 10 is made of core glass, and has a function of transmitting light made incident from one end to the other end.

The cladding 12 is provided in plural numbers corresponding to the plurality of cores 10, respectively, and is formed of cladding glass lower in refractive index than the core glass. Because the refractive index of the cladding 12 is lower than that of the core 10, light made incident into the core 10 is totally reflected at a boundary surface between the core 10 and the cladding 12. Therefore, the core 10 can propagate light from one end to the other end.

The core glass and cladding glass that form the cores 10 and the cladding 12, respectively, are made mainly of $SiO_2$, which is a glass network forming oxide (NWF: Network former). The core glass and cladding glass may be formed containing a glass network modification oxide (NWM: Network modifier) that does not become glass by itself and provides an appropriate property to glass by melting with an NWF, or an intermediate oxide having an intermediate property therebetween.

Moreover, the plurality of fibers 15 is interposed therebetween with the absorber glass 14 for absorbing stray light. The absorber glass 14 is disposed covering the outer periphery of the fiber 15. The absorber glass 14 is referred to as EMA (Extra Mural Absorption), and a method for preparing the FO 1 to have the above-described configuration is referred to as an EMA method.

The absorber glass 14 contains $Fe_3O_4$ being an oxide colorant and iron oxide crystals. In addition, the $Fe_3O_4$ has a wide absorption wavelength band, and has a more excellent absorption capacity than that of $Fe_2O_3$, which has been used as an oxide colorant. Therefore, making the absorber glass 14 contain $Fe_3O_4$ being iron oxide crystals allows obtaining excellent absorption characteristics from the visible light region to the near-infrared region. Moreover, in the absorber glass 14, the content of $Fe_3O_4$ being iron oxide crystals is, on the basis of all constituent materials of the absorber glass 14, preferably more than 18% and less than 30% in percent by mass, and more preferably more than 18% and less than 25% in percent by mass. By making the absorber glass 14 contain $Fe_3O_4$ at more than 18%, a higher absorption capacity can be obtained. Moreover, by making the absorber glass 14 contain $Fe_3O_4$ in a range of less than 30%, the absorber glass 14 can be homogeneously formed.

Moreover, the absorber glass 14 contains $SiO_2$ being an NWF. Moreover, the absorber glass 14 may further contain $B_2O_3$ being an NWF. $SiO_2$ and $B_2O_3$ are materials to form the skeleton of glass. The contents of these are not particularly limited in content as long as the absorption characteristics, stability, and strength of the absorber glass 14 are not spoiled, but for example, $SiO_2$ is contained in the absorber glass 14 in a range of 27% to 46% in percent by mass, and $B_2O_3$ is contained in the absorber glass 14 in a range of 5% to 20% in percent by mass.

Moreover, the absorber glass 14 may further contain $Al_2O_3$. $Al_2O_3$ has an effect of not only increasing the chemical durability of glass but also promoting crystallization of the iron oxide ($Fe_3O_4$) being an oxide colorant. Therefore, as a result of making the absorber glass 14 contain $Al_2O_3$, a large number of micro crystallites of $Fe_3O_4$ being iron oxide crystals precipitate at the time of heat treatment, and grow granularly. Moreover, in the absorber glass 14, by making this contain $Al_2O_3$ in a range of less than 7% in percent by mass, the absorber glass 14 can be homogeneously formed.

Moreover, the absorber glass 14 may further contain $K_2O$ and $Na_2O$. $K_2O$ and $Na_2O$ have an effect of increasing the coefficient of thermal expansion of the absorber glass 14 and lowering the glass transition point and the deformation point to facilitate melting of glass. For example, $K_2O$ is contained in the absorber glass 14 in a range of 3% to 11% in percent by mass, and $Na_2O$ is contained in the absorber glass 14 in a range of 0% to 10% in percent by mass.

Moreover, the absorber glass 14 may further contain CaO. CaO has an effect of suppressing movement of alkali ions such as $Na^+$ and $K^+$ and increasing the chemical durability of glass, and for example, is contained in the absorber glass 14 in a range of 0% to 3.5% in percent by mass.

The absorber glass 14 may further contain BaO. BaO has an effect of facilitating melting of glass, and for example, is contained in the absorber glass 14 in a range of 0% to 4.6% in percent by mass.

In the FO 1 including the absorber glass 14 described above, light made incident into the incident surface 2 of the FO 1 repeats total reflection in the cores 10, and is transmitted to the exit surface 3. In this case, light (stray light) leaking from the cores 10 without making total reflection may occur, however, because the absorber glass 14 interposed between the plurality of cores 10 contains $Fe_3O_4$ particles being iron oxide crystals and has satisfactory absorption characteristics from the visible light region to the near-infrared region, a phenomenon that stray light enters another core 10 can be sufficiently prevented, and this allows image transmission while maintaining a high resolution not only in the visible light region but also in the near-infrared light region.

As in the above, according to the first embodiment, by making the absorber glass 14 contain $Fe_3O_4$ being iron oxide crystals, the absorption capacity in the visible light region to the near-infrared region can be greatly improved. This allows forming an FO 1 with little degradation in resolution and noise. Moreover, because the absorber glass 14 does not require a lead compound, which is an environmental load substance, environmental pollution at the time of disposal can be reduced.

Moreover, in the FO 1, because $Fe_3O_4$ has a larger total surface area than that when $Fe_3O_4$ exists as a lump due to $Fe_3O_4$ being iron oxide crystals existing in a granular form, the absorption capacity of the absorber glass 14 can be greatly improved.

Moreover, in the FO 1, because $Al_2O_3$ acts as a crystal nucleator, crystal precipitation of $Fe_3O_4$ being iron oxide crystals can be promoted. Accordingly, crystal precipitation of $Fe_3O_4$ being iron oxide crystals can be efficiently performed. Moreover, due to $Al_2O_3$ acting as a crystal nucleator, the number of crystals of $Fe_3O_4$ being iron oxide crystals to be precipitated can be increased. Therefore, even with $Fe_3O_4$ of an identical mass, the size of individual crystals is reduced, and the total surface area of the crystals as a whole is increased, so that the absorption capacity of the absorber glass 14 can be greatly improved.

Next, a manufacturing method of the FO 1 according to the first embodiment will be described by use of FIGS. 3 to 6. FIGS. 3 to 6 show manufacturing processes of the FO 1.

Figure 3:
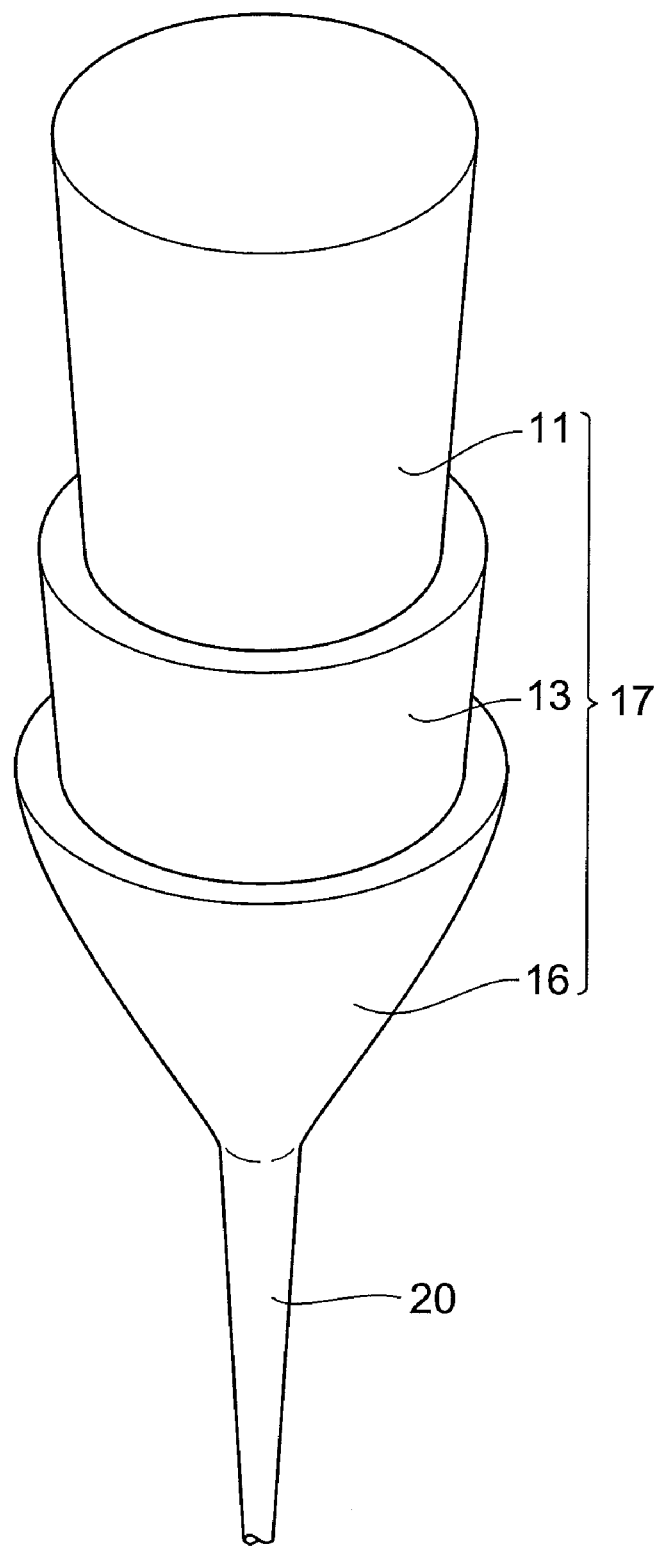
FIG. 3 A perspective view showing a manufacturing process of a single fiber 20 to be used for the FO 1 of FIG. 1.

First, as shown in FIG. 3, a single fiber 20 is manufactured. The single fiber 20 is formed of a core glass 11 and a cladding glass 13 and an absorber glass 16 covering therearound. The absorber glass 16 (first absorber glass) contains $Fe_2O_3$ to be crystallized later into $Fe_3O_4$. The core 10, the cladding 12, and the absorber glass 14 (second absorber glass) shown in FIG. 1 are formed of the core glass 11, the cladding glass 13, and the absorber glass 16 shown in FIG. 3, respectively. A composite body 17 made of the core glass 11, the cladding glass 13, and the absorber glass 16 is drawn by a roller through a heating device, whereby a single fiber 20 whose section has a homothetic figure to that of the composite body 17 is obtained.

Figure 4:
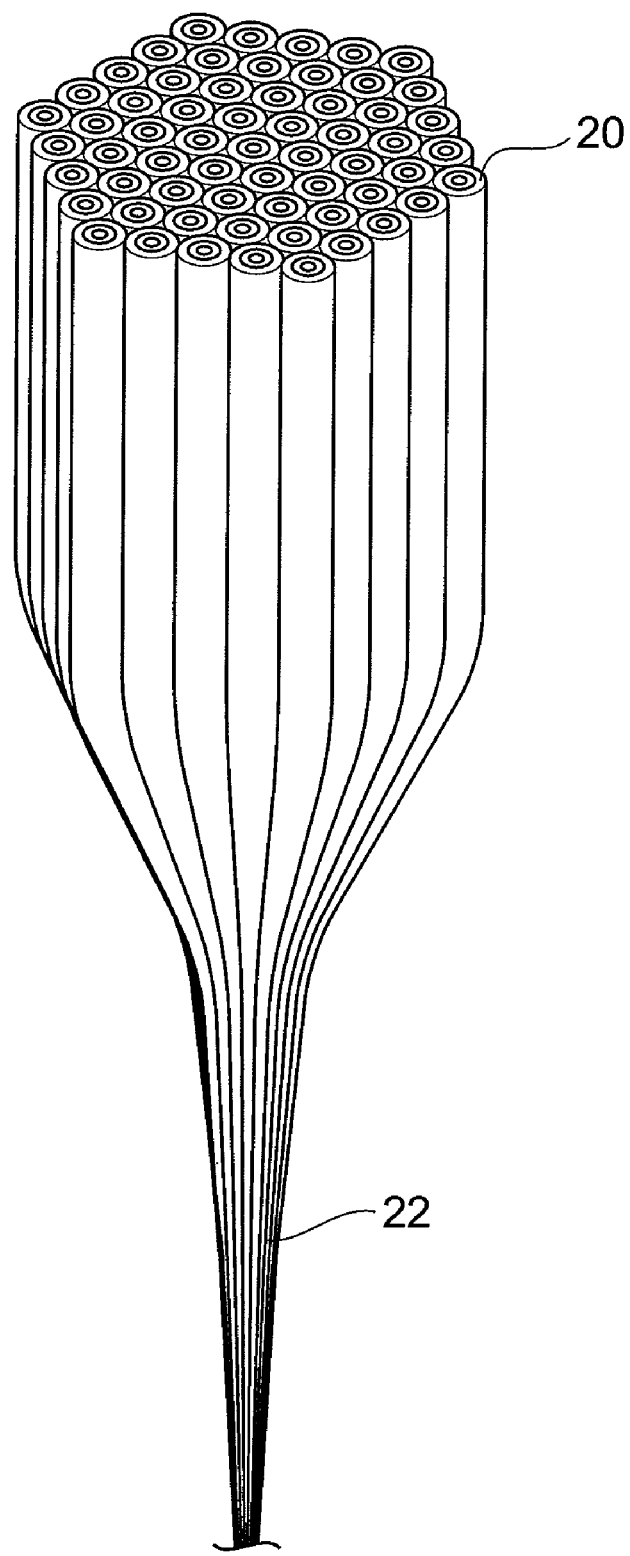
FIG. 4 A perspective view showing a manufacturing process of a multi-fiber 22 to be used for the FO 1 of FIG. 1.

Next, the prepared single fiber 20 is used to prepare a multi-fiber 22 as shown in FIG. 4. A plurality of single fibers 20 are aligned and drawn by a roller through a heating device, whereby the plurality of single fibers 20 are heat-fused, and a multi-fiber 22 is obtained.

Figure 5:
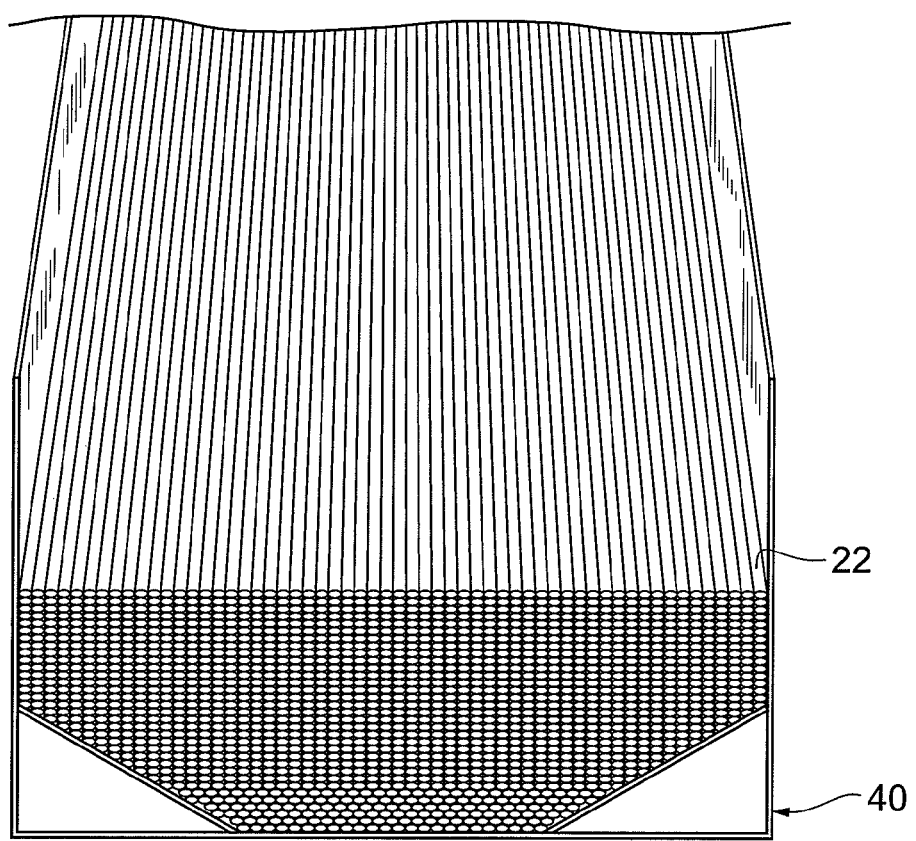
FIG. 5 A perspective view showing a manufacturing process for high-temperature pressing of the multi-fiber 22 of FIG. 4.
Figure 6:
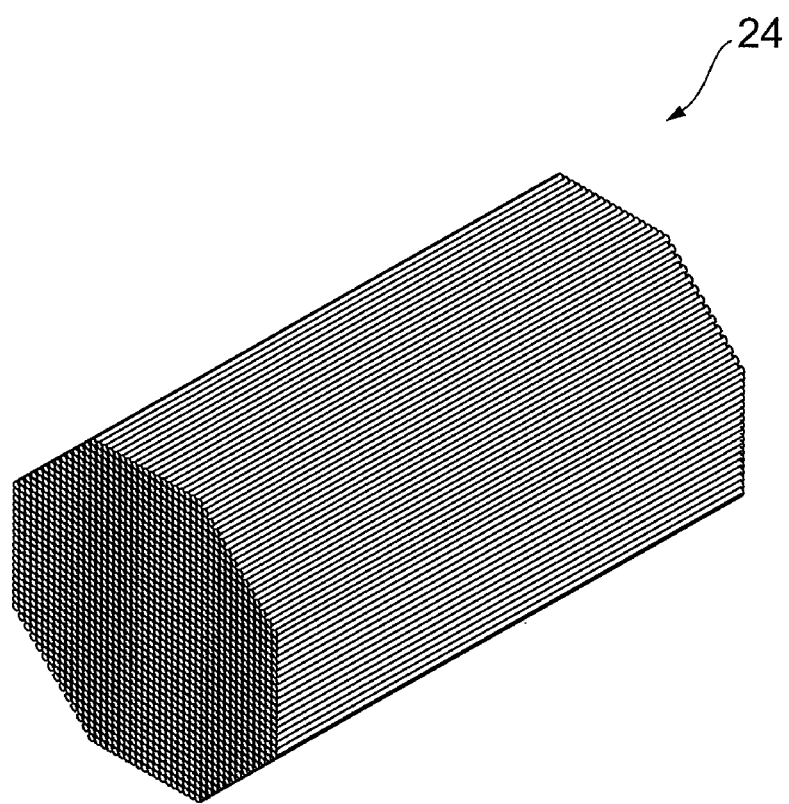
FIG. 6 A perspective view of an ingot formed by pressing the multi-fiber 22 of FIG. 4.

Next, as shown in FIG. 5, the multi-fibers 22 are aligned in an octagonal mold of a hot press 40 and pressed at high temperature, whereby the plurality of multi-fibers 22 are heat-fused, and an ingot 24 having an octagonal prism shape as shown in FIG. 6 is obtained.

By the heating treatment performed in the processes shown in FIG. 3 to FIG. 5 described above, $Fe_2O_3$ is crystallized in the absorber glass 16, and precipitated as $Fe_3O_4$, which are granular iron oxide crystals.

Next, the ingot 24 is sliced vertical to the axial direction and polished, whereby an FO 1 shown in FIG. 1 and FIG. 2 is completed.

Through the above processes, an FO 1 precipitated at the absorber glass 14 thereof with particles of $Fe_3O_4$ being iron oxide crystals is prepared. In the case of this manufacturing method, because granular $Fe_3O_4$ is formed by heat in the normal FO manufacturing processes, no new facility is required, which is thus excellent in terms of cost. Although a description has been given in FIG. 3 of the process of preparing the single fiber 20 using the absorber glass 16 containing $Fe_2O_3$, the single fiber 20 may be prepared using an absorber glass 14 for which a heat treatment of the absorber glass 16 containing $Fe_2O_3$ has been performed in advance to granularly precipitate $Fe_3O_4$ being iron oxide crystals. Even when, for example, an absorber glass 16 containing $Fe_2O_3$ that has been maintained at 750° C. for one hour by use of an electric furnace and then naturally cooled is used as a raw material of the single fiber 20, an FO 1 reliably precipitated at the absorber glass 14 thereof with particles of $Fe_3O_4$ being iron oxide crystals is prepared.

Second Embodiment

Figure 7:
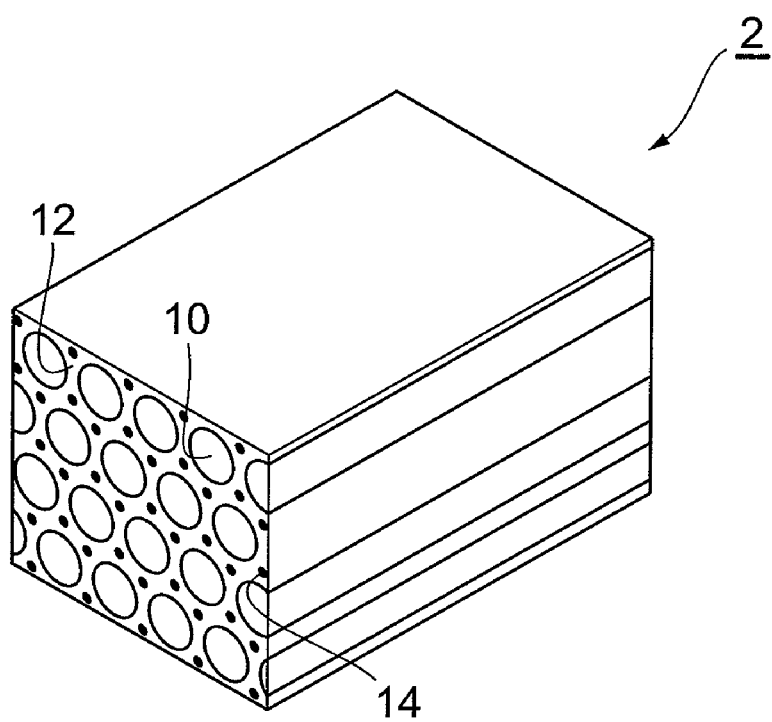
FIG. 7 A perspective view showing an internal structure of an FO 2 according to a second embodiment, in an enlarged manner.

Next, a second embodiment of the present invention will be described. FIG. 7 is a perspective view showing an internal structure of an FO 2 according to the second embodiment. The second embodiment has almost the same configuration as that of the FO 1 according to the first embodiment, and differs from the first embodiment in the point that an absorber glass 14 divided into a plurality of parts is provided between a plurality of cores 10.

More specifically, in the first embodiment, there has been a configuration where the cladding 12 exists in plural numbers and covers the outer peripheries of a plurality of cores 10, respectively, whereas in the second embodiment, there is a configuration where the cladding 12 covers the outer peripheries of a plurality of cores 10 in an integrated manner. Moreover, in the first embodiment, there has been a configuration where the absorber glass 14 covers the outer periphery of the cladding 12, whereas in the second embodiment, the cladding 12 covers the outer peripheries of a plurality of absorber glasses 14. A method for preparing the FO 2 to have the above-described configuration is referred to as an ISA (Interstitial Absorption) method.

Moreover, the materials to be used for the cores 10, the cladding 12, and the absorber glasses 14 of the FO 2 are the same as those of the first embodiment. When the FO 2 is made from such materials, light made incident into the incident surface of the FO 2 repeats total reflection in the cores 10, and is transmitted to the exit surface. In this case, light (stray light) leaking from the cores 10 without making total reflection may occur, however, because the plurality of absorber glasses 14 interposed between the plurality of cores 10 contain $Fe_3O_4$ particles being iron oxide crystals and have satisfactory absorption characteristics from the visible light region to the near-infrared region, a phenomenon that stray light enters another core 10 can be sufficiently prevented, and this allows image transmission while maintaining a high resolution not only in the visible light region but also in the near-infrared light region.

As in the above, according to the second embodiment, by making the absorber glass 14 contain $Fe_3O_4$ being iron oxide crystals, the absorption capacity in the visible light region to the near-infrared region can be greatly improved. This allows forming an FO 2 with little degradation in resolution and noise.

Figure 8:
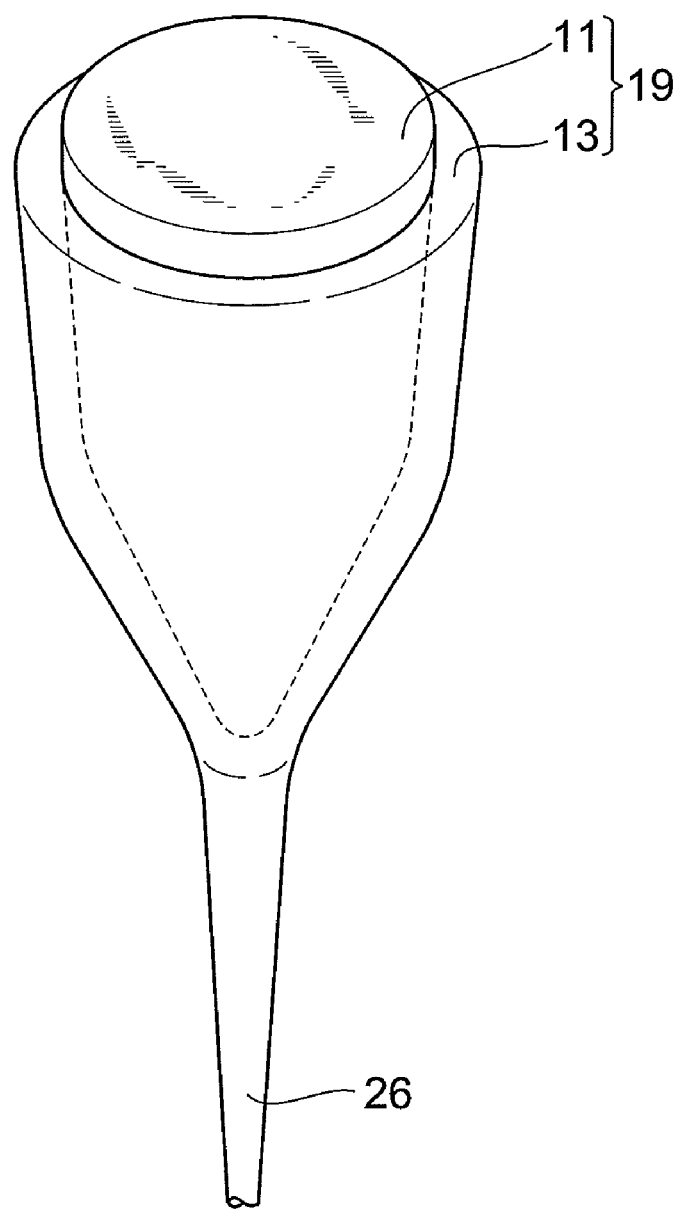
FIG. 8 A perspective view showing a manufacturing process of a single fiber 26 to be used for the FO 2 of FIG. 7.
Figure 9:
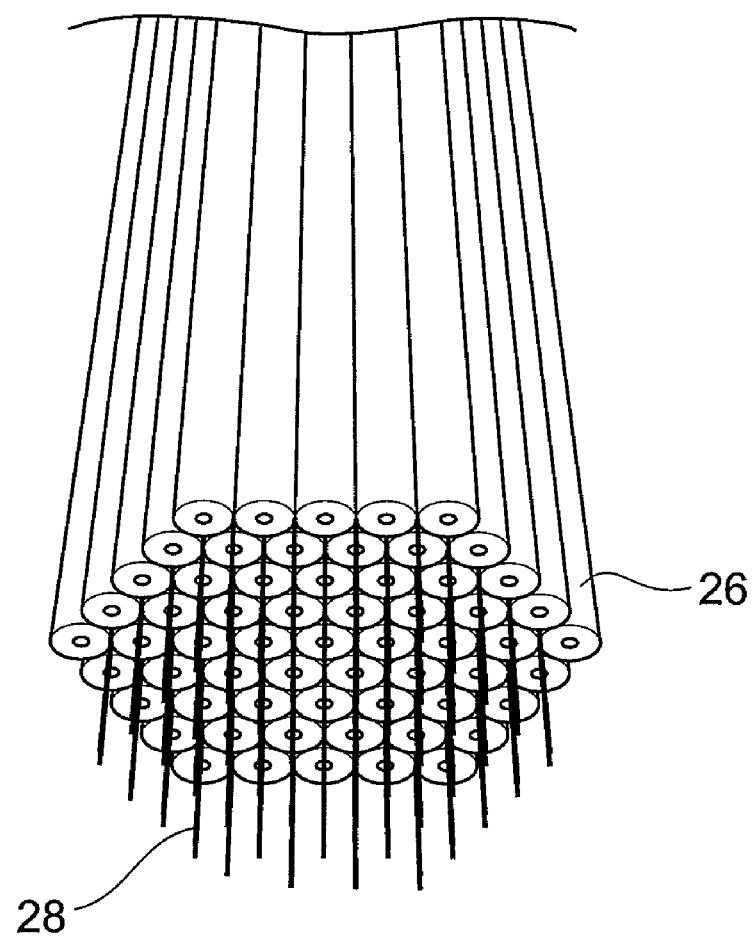
FIG. 9 A perspective view showing a manufacturing process of a multi-fiber to be used for the FO 2 of FIG. 7.
Figure 10:
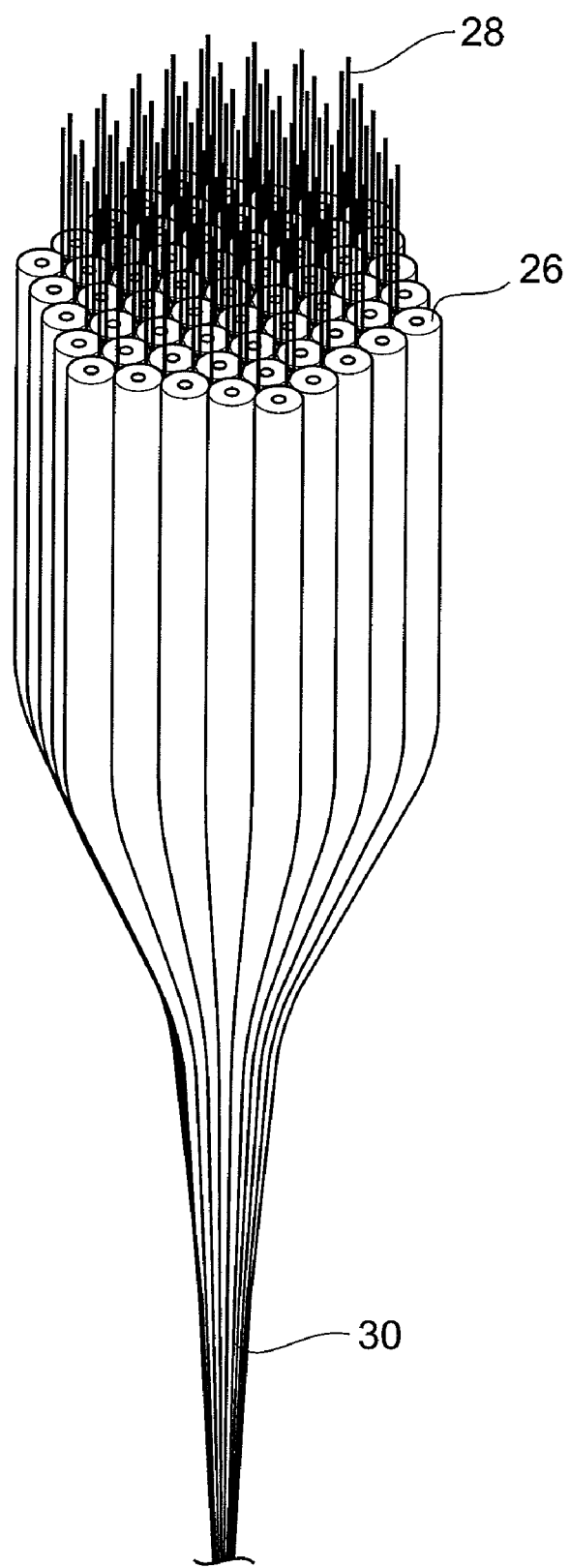
FIG. 10 A perspective view showing a manufacturing process of a multi-fiber to be used for the FO 2 of FIG. 7.

In the following, a preparing method of the FO 2 according to the second embodiment will be described. FIGS. 8, 9, and 10 show manufacturing processes of the FO 2.

First, as shown in FIG. 8, a single fiber 26 is manufactured. The single fiber 26 differs from the single fiber 20 of the first embodiment in the point of including no absorber glass, and is formed of a core glass 11 and a cladding glass 13 cladding therearound. A composite body 19 made of the core glass 11 and the cladding glass 13 is drawn by a roller through a heating device, whereby a single fiber 26 whose section has a homothetic figure to that of the composite body 19 is obtained.

Next, as shown in FIG. 9, a plurality of absorber fibers 28 (first absorber glasses) are arranged between a plurality of single fibers 26 and these are aligned. Then, as shown in FIG. 10, these are drawn by a roller through a heating device, whereby the single fibers 26 and the absorber fibers 28 are heat-fused, and a multi-fiber 30 is obtained. The absorber fiber 28 is an absorber glass that has been melted and drawn, and has the same composition as that of the absorber glass 16 of the first embodiment.

Next, a plurality of prepared multi-fibers 30 are aligned and drawn by a roller through a heating device, whereby a multi-multi-fiber (not shown) is prepared. The multi-multi-fibers thus prepared are aligned in a mold of a hot press and pressed at high temperature, whereby the multi-multi-fibers are heat-fused, and an ingot having an octagonal prism shape is obtained as in the first embodiment. The ingot is sliced and polished, whereby an FO 2 is completed.

Moreover, by the heating treatment performed in the processes described above, $Fe_2O_3$ is crystallized in the absorber fiber 28, and precipitated as $Fe_3O_4$, which are granular iron oxide crystals.

Through the above processes, an FO 2 precipitated at the absorber glass thereof with particles of $Fe_3O_4$ being iron oxide crystals is prepared. Although the absorber fiber 28 containing $Fe_2O_3$ has been used in FIG. 9, an absorber fiber for which a heat treatment of the absorber glass containing $Fe_2O_3$ has been performed in advance to granularly precipitate $Fe_3O_4$ being iron oxide crystals may be used. Even when, for example, an absorber glass that has been maintained at 750° C. for one hour by use of an electric furnace and then naturally cooled is used as a raw material of the absorber fiber, an FO 2 reliably precipitated at the absorber glass thereof with particles of $Fe_3O_4$ being iron oxide crystals is prepared.

Examples

Hereinafter, effects of the FOs according to embodiments will be described in detail based on experimental results. The inventors of the present invention prepared an absorber glass containing $SiO_2$, $B_2O_3$, $Al_2O_3$, $Na_2O$, $K_2O$, $CaO$, $BaO$, and $Fe_2O_3$. Moreover, a heat treatment was performed for the absorber glass at 750° C. for one hour to prepare an absorber glass containing $SiO_2$ by 34.5%, $B_2O_3$ by 18.2%, $Al_2O_3$ by 3.6%, $Na_2O$ by 9.1%, $K_2O$ by 4.5%, $CaO$ by 2.7%, $BaO$ by 4.5%, and $Fe_3O_4$ by 22.7% in percent by mass.

Figure 11:
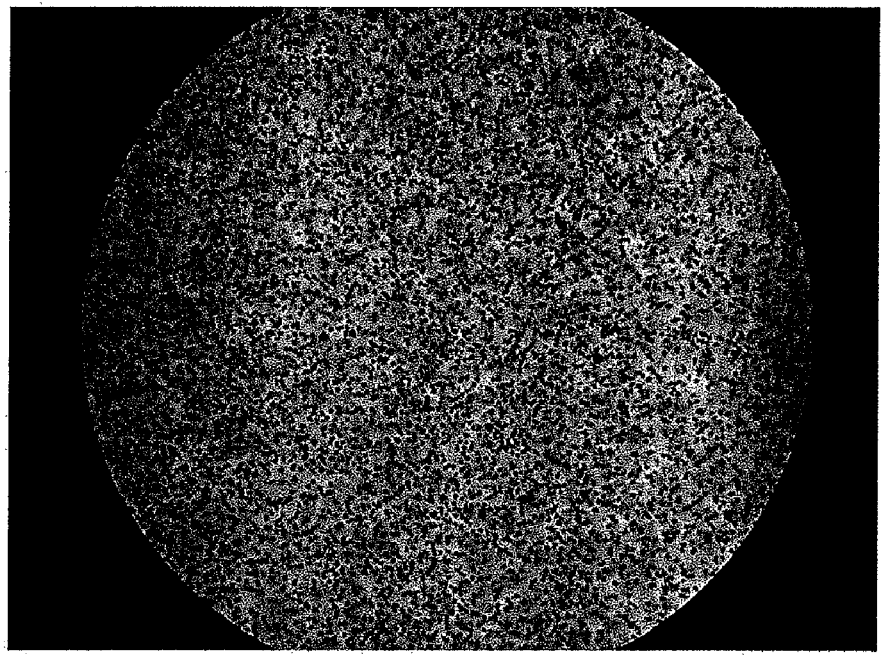
FIG. 11 A micrograph of an absorber glass of an FO.
Figure 12:
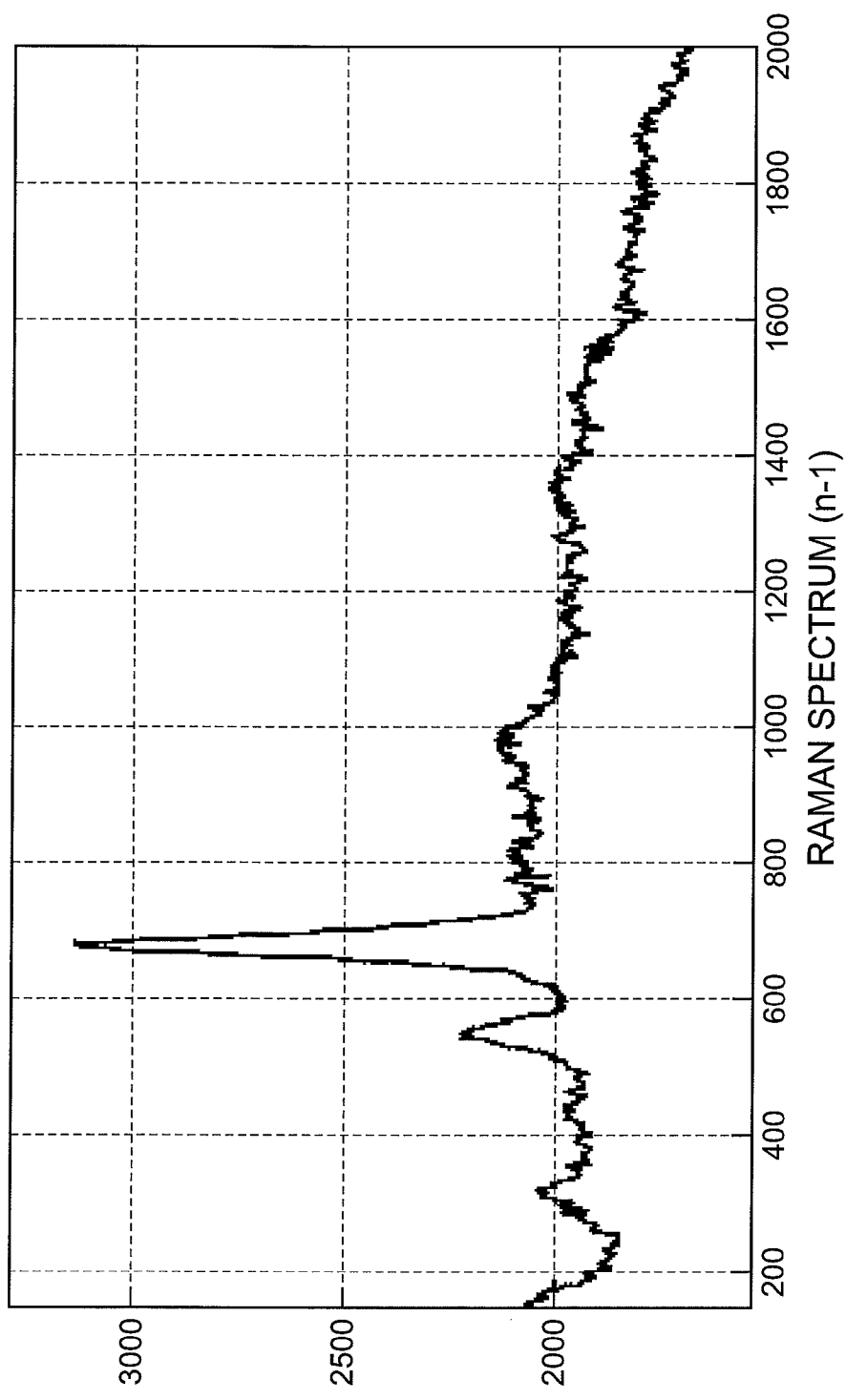
FIG. 12 A Raman spectrum of the absorber glass of the FO.
Figure 13:
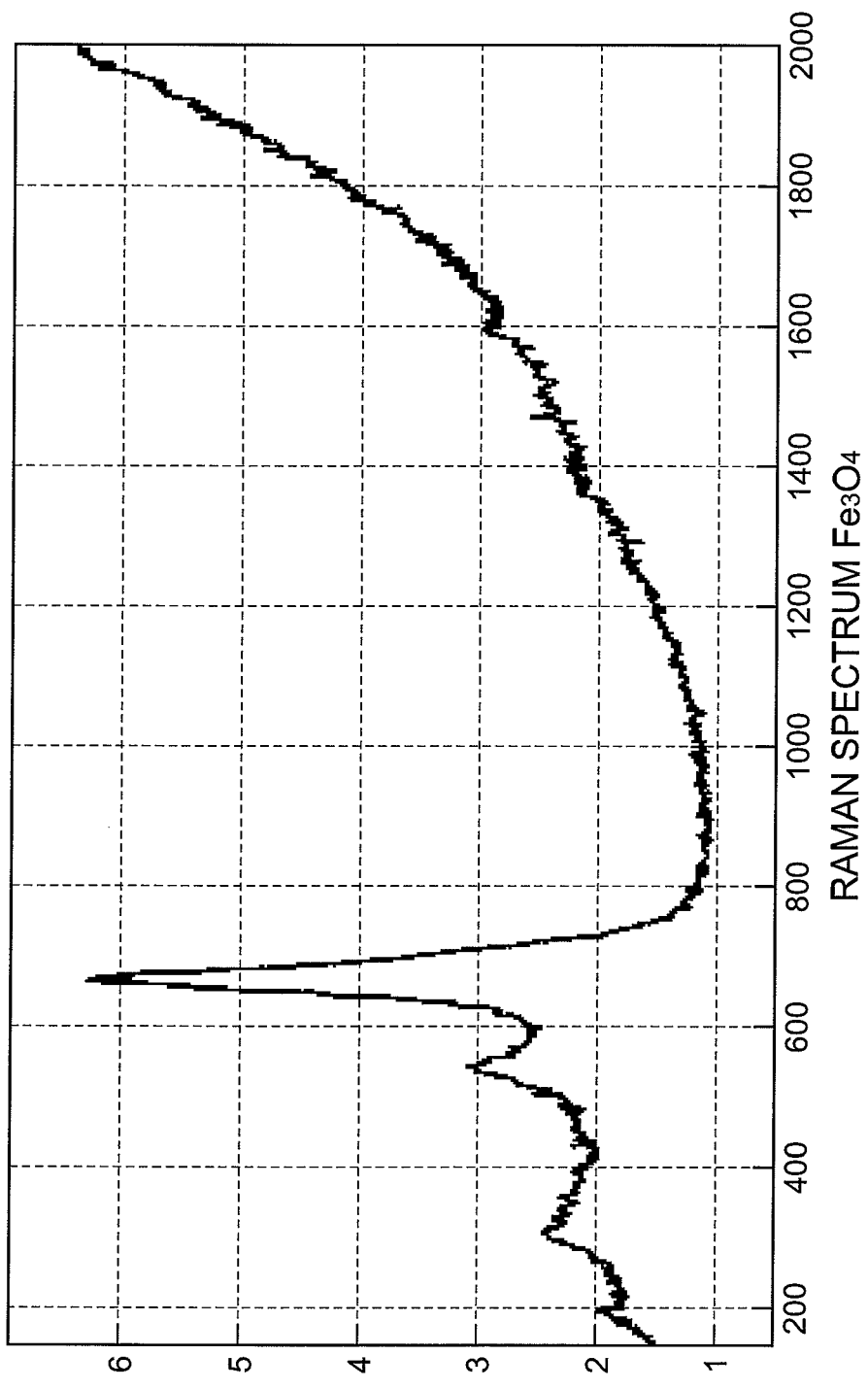
FIG. 13 A reference Raman spectrum of $Fe_3O_4$.
Figure 14:
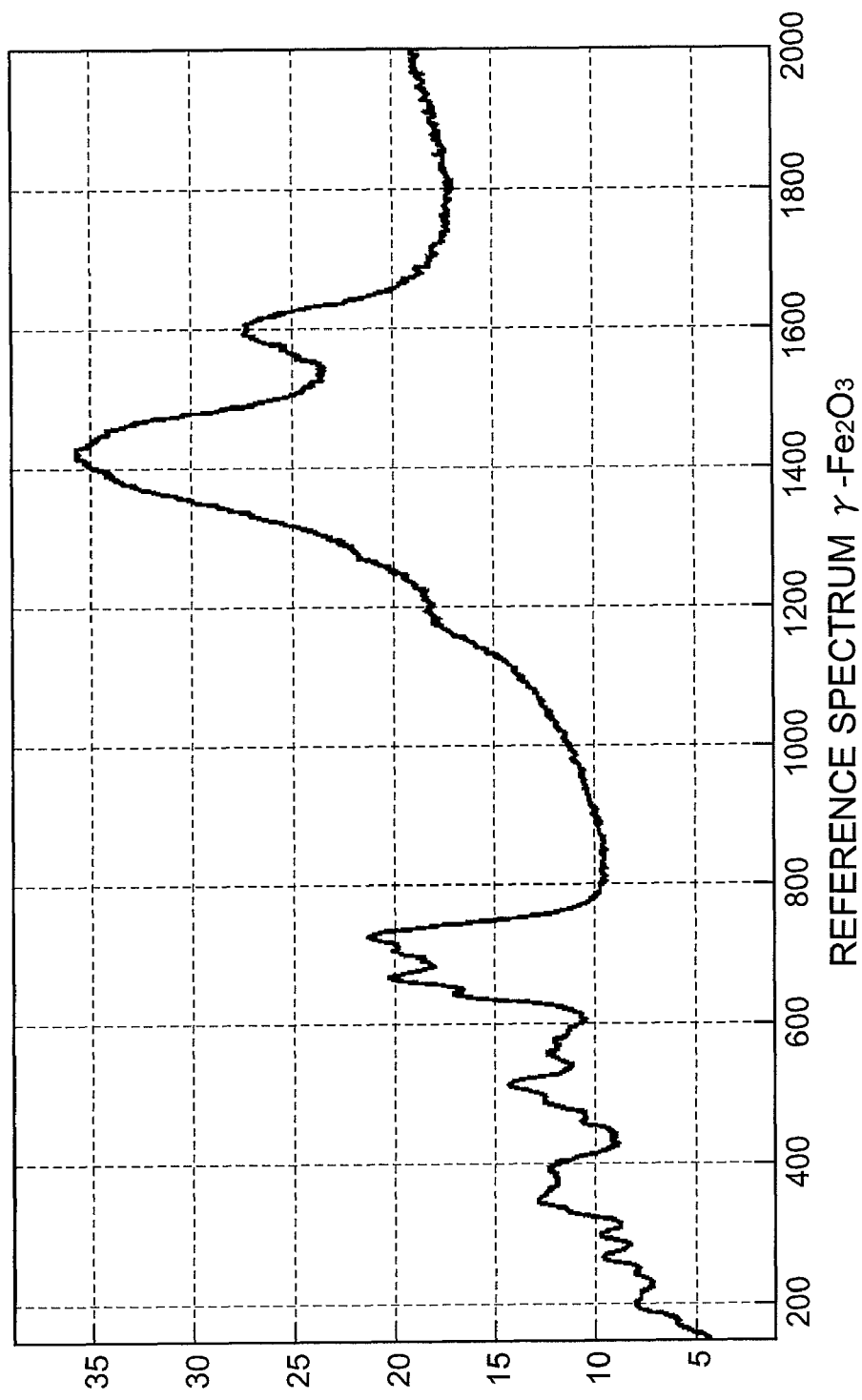
FIG. 14 A reference Raman spectrum of $Fe_2O_3$.

A structure of the absorber glass was evaluated by the following procedure. First, the absorber glass after heat treatment was processed into a thickness allowing a transmitted light observation, and observed through a microscope. A micrograph of the absorber glass is shown in FIG. 11. Moreover, a structure of the iron oxide contained in the absorber glass after heat treatment was analyzed by laser Raman spectroscopy. A Raman spectrum of the absorber glass is shown in FIG. 12. In addition, FIG. 13 and FIG. 14 are reference spectra for making comparison with FIG. 12, wherein FIG. 13 shows a Raman spectrum of $Fe_3O_4$ of iron oxide crystals, and FIG. 14 shows a Raman spectrum of $Fe_2O_3$ of iron oxide crystals.

It has been confirmed from the micrograph of FIG. 11 that a large number of crystals of approximately 1 μm have precipitated due to a heat treatment in the absorber glass. Moreover, it has been confirmed that $Fe_3O_4$ (magnetite) of iron oxide crystals has precipitated in the absorber glass because the Raman spectrum shown in FIG. 12 is closer to the Raman spectrum of $Fe_3O_4$ of iron oxide crystals shown in FIG. 13 than the Raman spectrum of $Fe_2O_3$ of iron oxide crystals shown in FIG. 14. Thereby, it has been confirmed that the precipitated particles shown in FIG. 11 are not $Fe_2O_3$ (γ-maghemite) of iron oxide crystals but $Fe_3O_4$ of iron oxide crystals.

Next, in order to confirm the effects of crystallization of $Fe_3O_4$ of iron oxide crystals after heat treatment, transmittance of the absorber glass was evaluated by the following procedure. First, the absorber glass before heat treatment was adhered to soda-lime glass by an epoxy adhesive, and lap-polished thin to a thickness of 150 μm. Into the absorber glass, LED light having a wavelength of approximately 600 nm to approximately 980 nm was made incident by means of a spectrometer to measure a spectral transmittance. Next, a spectral transmittance measurement of the absorber glass after heat treatment was performed by the same method. Spectral transmittance measurement results of the absorber glass before and after heat treatment are shown in FIG. 15.

Figure 15:
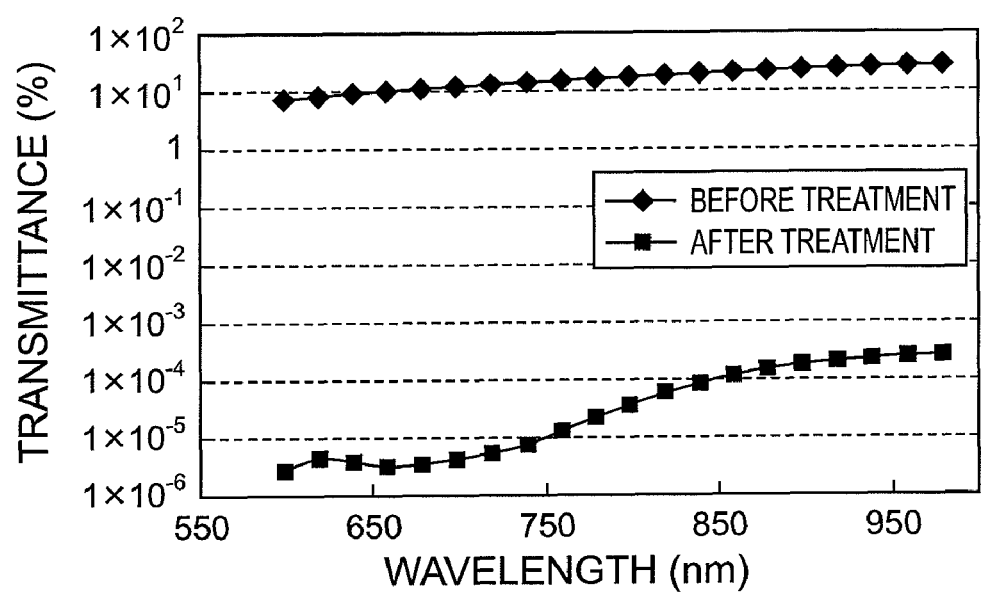
FIG. 15 A graph showing spectral transmittance measurement results of an absorber glass before and after heat treatment.

As shown in FIG. 15, the absorber glass before heat treatment had a transmittance of approximately 10% or more in a wavelength range of approximately 600 nm to approximately 980 nm, whereas the absorber glass after heat treatment had a transmittance of $1\times10^{-3}$% or less in a wavelength range of approximately 600 nm to approximately 980 nm, and particularly in a range of approximately 600 nm to approximately 750 nm, a very low transmittance of approximately $1\times10^{-5}$ to approximately $1\times10^{-6}$%. Thereby, it has been confirmed that the transmittance of the absorber glass after heat treatment is considerably reduced from the transmittance of the absorber glass before heat treatment.

It has been confirmed by the above that the absorption capacity is greatly improved, as a result of $Fe_3O_4$ being crystallized and precipitated on the absorber glass by heat treatment. Moreover, it has been confirmed that the absorption capacity is greatly improved, because the total surface area has been increased at an identical mass as a result of $Fe_3O_4$ being iron oxide crystals being particulated.

Next, the inventors of the present invention prepared absorber glasses modified in the content of the iron oxide. FIG. 16 shows, in terms of the samples of Nos. 1 to 13 of those prepared absorber glasses applied with a one-hour heat treatment at 750° C. after cooling, a percentage by mass of the composition of each glass (numerical value after preparation of each absorber glass), a coefficient of thermal expansion, a glass transition point, a deformation point, a vitrified state, and a transmittance with respect to light having a wavelength of 850 nm. The sample of No. 5 has the same composition as that of the absorber glass for which a structural analysis and a spectral transmittance measurement have been conducted before and after heat treatment. Moreover, samples No. 1 and No. 3 substantially not containing $Fe_3O_4$ were prepared as comparative examples with absorber glasses containing $Fe_3O_4$. Moreover, the transmittances of these absorber glasses were measured with the sample lap-polished to a thickness of 100 μm and the wavelength fixed at 850 nm by the aforementioned spectral transmittance measurement system. In sample No. 2 of FIG. 16, a residual composition not displayed is ZnO: 4.5% and $La_2O_3$: 4.5% in percent by mass.

First, the transmittances of the absorber glasses where the iron oxide has become $Fe_3O_4$ and the transmittances of the absorber glasses where the iron oxide remains $Fe_2O_3$ and has not been crystallized were compared. As shown in No. 1 and No. 3, the absorber glasses where the iron oxide remains $Fe_2O_3$ have transmittances of approximately 10% to 20% with respect to an incident light having a wavelength of 850 nm, whereas the absorber glasses where the iron oxide has become $Fe_3O_4$ shown in No. 2 and Nos. 4 to 13 have transmittances of approximately $1\times10^{-5}$% to approximately $1\times10^{-6}$% with respect to an incident light having a wavelength of 850 nm. Thereby, it has been confirmed that the absorber glasses where the iron oxide has become $Fe_3O_4$ have considerably lower transmittances than those of the absorber glasses where the iron oxide remains $Fe_2O_3$.

Next, vitrified states of the absorber glasses were confirmed focusing on the content of $Fe_3O_4$ of iron oxide crystals. It has been confirmed that the vitrified state is satisfactory in terms of the samples of Nos. 1 to 12, that is, the samples where the contents of $Fe_3O_4$ are 18.2 to 25% in percent by mass. However, in the sample of No. 13, that is, the sample where the content of $Fe_3O_4$ of iron oxide crystals is 30% in percent by mass, the vitrified state is insufficient as compared with that of the samples of Nos. 1 to 12. Therefore, vitrification can be sufficiently performed in a range where the content of $Fe_3O_4$ of iron oxide crystals is less than 30% in percent by mass.

Next, conditions for precipitation of crystals of an iron oxide in a glass were studied. Processes of crystal nucleation and crystal growth are necessary for precipitating crystals in a glass. For the crystal nucleation, a crystal nucleator is used in most cases. When the crystal nucleator is added to the glass and a heat treatment is performed, a large number of micro crystallites containing a crystal nucleation component precipitate, and main crystals grow around those micro crystallites. Moreover, the rate of such crystal nucleation and crystal growth is in a relation of inverse proportion to the glass viscosity. Therefore, glass with a lower viscosity facilitates atomic movement, thereby promoting the crystal nucleation and crystal growth. The deformation temperature ($A_t$) provides an indication of the glass viscosity. Further, it is necessary that a sufficient amount of material to be crystallized is contained in the glass.

When sorting out the conditions of a glass where crystals are likely to precipitate in line with the present example, there are conditions that: (1) $Al_2O_3$ has been added as a crystal nucleator and the moving distance of atoms is short, (2) the deformation temperature is low, and (3) the content of the iron oxide is above a certain level. Based on the above conditions, it has been confirmed in terms of the samples having large transmittances if these satisfy the satisfactory crystal precipitating conditions. First, in the sample of No. 1, the iron oxide content indicates a low value of 18.2% in percent by mass, and it has thus been confirmed that the material to be crystallized has not been sufficiently contained, and crystallization is unlikely to occur. Moreover, in the sample of No. 3, it has been confirmed that crystallization is unlikely to occur because the $SiO_2$ content is large and the viscosity is slightly high, and atomic movement has not been sufficiently performed with the heat treatment condition of one hour at 750° C. Also, in the sample of No. 4 where $Fe_3O_4$ has been confirmed, it has been confirmed that crystallization does not sufficiently occur because the iron oxide content is not sufficient and the viscosity is also high. As described above, because sufficient crystallization has not occurred, the sample of No. 4 resulted in a larger transmittance than that of the samples of No. 2 and Nos. 5 to 13 where $Fe_3O_4$ has been crystallized. On the other hand, as shown by the samples of No. 2 and Nos. 5 to 13, it has been confirmed that satisfactory crystal precipitation occurs and the absorption capacity is improved in the absorber glasses where $Al_2O_3$ has been added as a crystal nucleator, the deformation temperature is low, and the content of the iron oxide is above a certain level.

Next, a performance evaluation of the absorber glasses was performed. An FO is structured so that light in the air is gradually inhibited from being made incident into the FO as the center axes of the single fibers being components and the incident surface are slanted. By making in this state light incident into the incident surface of the FO from every direction and measuring the amount of light transmitted from the exit surface side of the FO, a performance evaluation of the absorber glasses can be performed. The smaller the amount of transmitted light, the more excellent the performance is.

First, slant FOs were prepared using the absorber glasses shown in No. 4 and No. 8. These absorber glasses contain $Fe_3O_4$ being iron oxide crystals, and $Fe_3O_4$ contained in the absorber glass of No. 8 has been crystallized more than that in No. 4 as mentioned above. Moreover, a slant FO was prepared using the absorber glass containing $Fe_2O_3$ shown in No. 3 as a comparative example. The content of $Fe_2O_3$ shown in No. 3 is the same as the content of $Fe_3O_4$ shown in FIG. 4, which is favorable in comparing the absorption capacity resulting from the composition. Moreover, the glass compositions, the refractive indices, the coefficients of thermal expansion, the glass transition points, the deformation points, and the densities of a core glass and a cladding glass used in the present example are shown in FIG. 17. In addition, it suffices that the core glass is higher in refractive index than the cladding glass, and two composition examples of the core glass indicated in percentage by mass are shown in the present example. In a slant FO to be used for fingerprint detection, it is preferable to set the numerical aperture to 0.35 to 0.45 from the standpoint of resolution.

Figure 18:
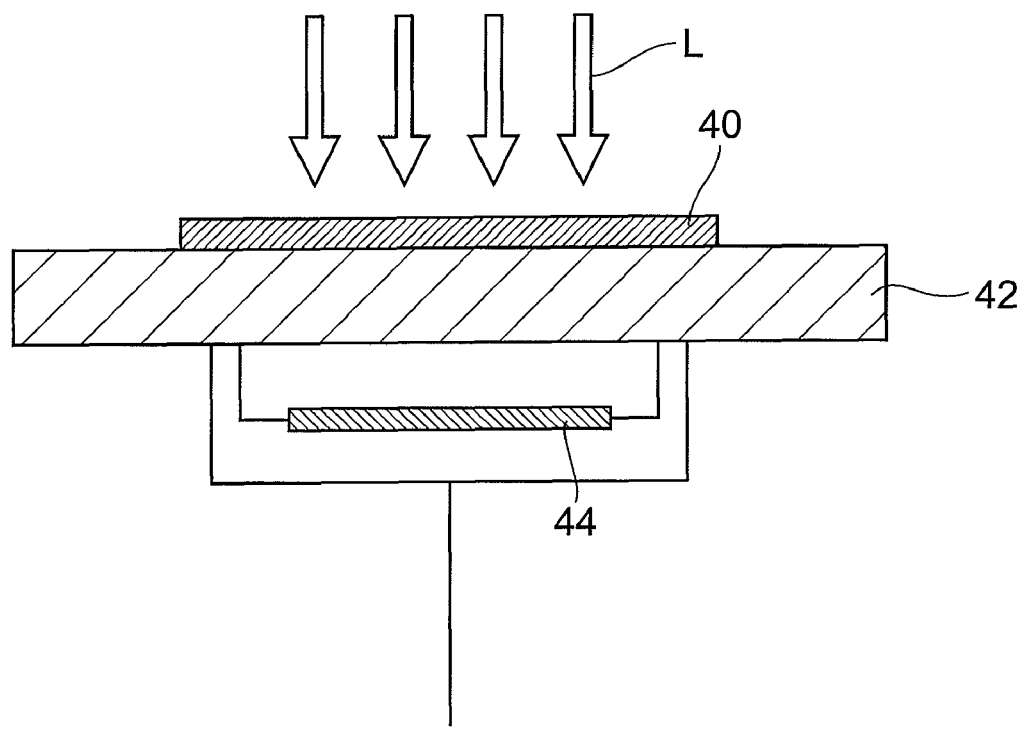
FIG. 18 A view of transmittance measurement of a slant FO.
Figure 19:
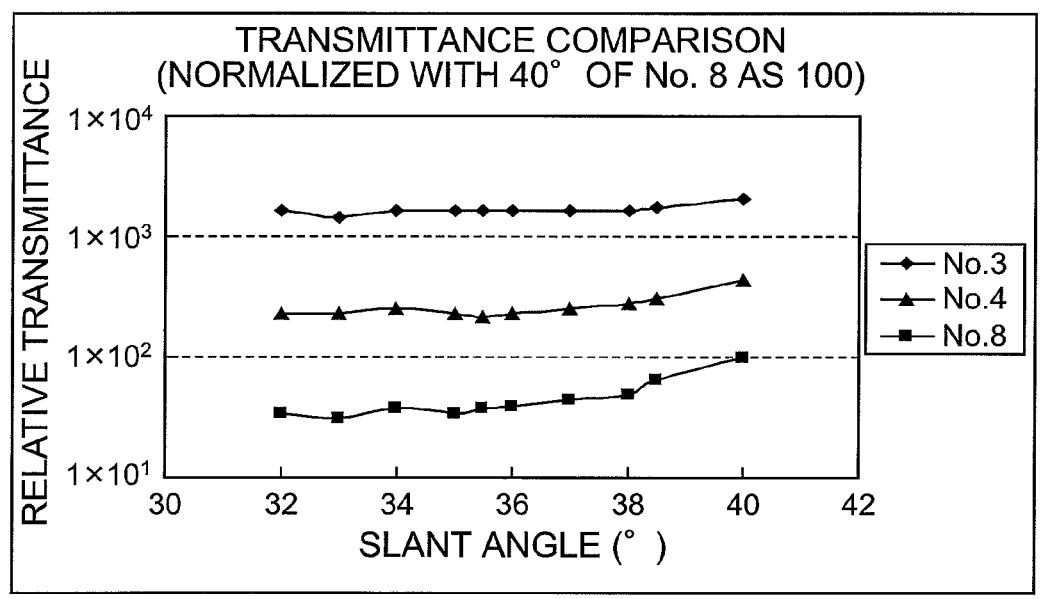
FIG. 19 A graph showing transmittance measurement results of the slant FO.

The transmittance of the prepared slant FOs was evaluated by the following procedure. As shown in FIG. 18, an LED light L having a wavelength of 850 nm was made incident through a diffuser 40 made of opal glass into a slant FO 42 that has been lap-polished to a thickness of 1 mm, and transmitted light was detected by a silicon photodiode 44. The measurement results are shown in FIG. 19. The transmittances shown in FIG. 19 have been normalized with the transmittance at a slant angle 40° when the absorber glass shown by No. 8 of FIG. 16 was used, as 100.

First, it has been confirmed by a comparison between the transmittance of the absorber glass containing $Fe_2O_3$ shown in No. 3 of FIG. 16 and the transmittance of the absorber glass containing $Fe_3O_4$ being iron oxide crystals shown in No. 4 that the transmittance of the absorber glass shown in No. 4 is smaller. Moreover, it has been confirmed by a comparison between the transmittance of the absorber glass shown in No. 8 and the transmittance of the absorber glass shown in No. 4 that the transmittance of the absorber glass shown in No. 8 where $Fe_3O_4$ has been crystallized more is smaller, and the absorber glass shown in No. 8 is more excellent in absorption capacity.

In the present example, the light L is diffused by the diffuser 40 into various directions and made incident into the slant FO 42, and the incident light within the maximum light receiving angle results in an output of a total amount of light transmitted in the fibers and light reaching across the FO when the slant angle is large (here, 40°), and results in an output of only the amount of light reaching across the FO when the slant angle is small (here, 32° to 36°). That is, it has been indicated that, of the light made incident into the slant FO 42, light over the maximum light receiving angle (stray light) to be emitted across the FO can be shielded by adopting an absorber glass precipitated with crystals of $Fe_3O_4$. Accordingly, degradation in resolution and the like can be favorably prevented.

The embodiments described above indicate examples of an FO according to the present invention. The FO according to the present invention is not limited to these FOs according to the embodiments, and the FOs according to the embodiments may be modified, or applied to others, within a range not changing the gist described in the claims.

The same effects as those of the present embodiment can also be obtained when, for example, FOs or slant FOs are joined by an adhesive and used. Moreover, the single fiber used in the present invention is not limited to the shape indicated in the present embodiment, and the same effects can be obtained even in, for example, a tapered form.

The invention claimed is:

1. A fiber optic comprising:
a plurality of fibers each including a core made of core glass for propagating light and a cladding for covering an outer periphery of the core and made of cladding glass lower in refractive index than the core glass; and
an absorber glass arranged between the plurality of fibers and for absorbing light leaking from the plurality of fibers, wherein
the plurality of fibers are bundled and integrated,
the absorber glass contains $Fe_3O_4$ being iron oxide crystals, and
wherein the absorber glass contains $Fe_3O_4$ being iron oxide crystals of more than 18% and less than 30% in percent by mass.

2. The fiber optic according to claim 1, wherein the absorber glass is arranged between the plurality of fibers and covers outer peripheries of the plurality of fibers.

3. The fiber optic according to claim 1, comprising a plurality of absorber glasses, wherein the cladding is arranged between the plurality of absorber glasses and covers outer peripheries of the plurality of absorber glasses.

4. The fiber optic according to claim 1, wherein $Fe_3O_4$ being iron oxide crystals of the absorber glass is granularly precipitated in the absorber glass.

5. The fiber optic according to claim 4, wherein the absorber glass further contains $Al_2O_3$.

6. The fiber optic according to claim 5, wherein the absorber glass contains $Al_2O_3$ of less than 7% in percent by mass.

7. A fiber optic formed by drawing while heat-fusing a plurality of single fibers and a plurality of absorber glasses, the plurality of single fibers comprising core glass covered with cladding glass, the plurality of absorber glasses containing $Fe_3O_4$ being iron oxide crystals precipitated through a heat treatment, and
wherein the plurality of absorber glasses contain $Fe_3O_4$ being iron oxide crystals of more than 18% and less than 30% in percent by mass.

8. A fiber optic formed by drawing while heat-fusing a plurality of single fibers and a plurality of first absorber glasses, the plurality of single fibers comprising core glass covered with cladding glass, the plurality of first absorber glasses containing $Fe_2O_3$, wherein
a plurality of second absorber glasses formed of the plurality of first absorber glasses contain $Fe_3O_4$ being iron oxide crystals precipitated by heat at the time of heat fusing, and
wherein the plurality of second absorber glasses contain $Fe_3O_4$ being iron oxide crystals of more than 18% and less than 30% in percent by mass.

* * * * *